(12) United States Patent
Wilking et al.

(10) Patent No.: US 9,195,690 B2
(45) Date of Patent: Nov. 24, 2015

(54) ITERATIVE MEASURES

(71) Applicants: Michael Wilking, Zuzenhausen (DE);
Stefan Dipper, Wiesloch (DE);
Sebastian Schroetel, Heidelberg (DE)

(72) Inventors: Michael Wilking, Zuzenhausen (DE);
Stefan Dipper, Wiesloch (DE);
Sebastian Schroetel, Heidelberg (DE)

(73) Assignee: SAP SE, Walldorf (DE)

( * ) Notice: Subject to any disclaimer, the term of this patent is extended or adjusted under 35 U.S.C. 154(b) by 266 days.

(21) Appl. No.: 13/927,498

(22) Filed: Jun. 26, 2013

(65) Prior Publication Data

US 2015/0006588 A1    Jan. 1, 2015

(51) Int. Cl.
*G06F 17/30* (2006.01)

(52) U.S. Cl.
CPC ................................ *G06F 17/30292* (2013.01)

(58) Field of Classification Search
USPC .................................................. 707/791, 802
See application file for complete search history.

(56) References Cited

U.S. PATENT DOCUMENTS

| | | | |
|---|---|---|---|
| 7,499,914 B2 * | 3/2009 | Diab et al. ............................. | 1/1 |
| 7,689,477 B2 | 3/2010 | Gabelmann et al. | |
| 8,055,369 B2 | 11/2011 | Birjandi et al. | |
| 8,069,101 B1 | 11/2011 | Von Groll et al. | |
| 8,200,521 B2 | 6/2012 | Hader | |
| 8,255,265 B2 | 8/2012 | Warier et al. | |
| 8,392,364 B2 | 3/2013 | Horn et al. | |
| 8,402,473 B1 | 3/2013 | Becker et al. | |
| 2002/0169657 A1 | 11/2002 | Singh et al. | |
| 2002/0188499 A1 * | 12/2002 | Jenkins et al. ................... | 705/10 |
| 2003/0204463 A1 | 10/2003 | Mitsukuni et al. | |
| 2003/0208392 A1 * | 11/2003 | Shekar et al. ...................... | 705/8 |
| 2004/0059649 A1 * | 3/2004 | Sakuma et al. ................... | 705/28 |
| 2004/0230445 A1 * | 11/2004 | Heinzel et al. .................... | 705/1 |
| 2005/0075951 A1 * | 4/2005 | Zieger ............................. | 705/28 |
| 2005/0114241 A1 | 5/2005 | Hirsch et al. | |
| 2005/0131578 A1 * | 6/2005 | Weaver ......................... | 700/244 |
| 2005/0159997 A1 | 7/2005 | John | |
| 2008/0147490 A1 * | 6/2008 | Najmi et al. .................... | 705/10 |
| 2008/0310260 A1 * | 12/2008 | Segal ............................. | 368/281 |
| 2010/0161366 A1 | 6/2010 | Clemens et al. | |
| 2010/0161453 A1 * | 6/2010 | Powell et al. ................... | 705/29 |
| 2012/0029967 A1 | 2/2012 | Kukreja et al. | |
| 2013/0018696 A1 * | 1/2013 | Meldrum ..................... | 705/7.27 |

FOREIGN PATENT DOCUMENTS

| | | | |
|---|---|---|---|
| EP | 1 225 528 A2 | 7/2002 | |
| EP | 1 248 216 A1 | 10/2002 | |
| EP | 1471447 A2 | 10/2004 | |

\* cited by examiner

*Primary Examiner* — Kim Nguyen
(74) *Attorney, Agent, or Firm* — Buckley, Maschoff & Talwalkar LLC

(57) ABSTRACT

A system includes determination of a dimension over which to iterate, determination of a first measure for which an aggregated value is determined per iteration, determination of a second measure for which a value is determined once per calculation of an iterative measure and against which to compare the aggregated value per iteration, and storage of the dimension, the first measure and the second measure as metadata of an iterative measure.

3 Claims, 6 Drawing Sheets

| MEASURE | ASSOCIATION_NO | Association type | Associated measure |
|---|---|---|---|
| ... | ... | ... | ... |
| 0VC_ST_COV | 1 | STOCK_COVERAGE_STOCK | 0VC_STOCK_1 |
| 0VC_ST_COV | 2 | STOCK_COVERAGE_STOCK | 0VC_STOCK_2 |
| 0VC_ST_COV | 3 | STOCK_COVERAGE_DEMAND | 0VC_DMD_1 |
| 0VC_ST_COV | 4 | STOCK_COVERAGE_DEMAND | 0VC_DMD_2 |
| 0VC_ST_COV | 5 | STOCK_COVERAGE_SUPPLY | 0VC_SUP_1 |
| 0VC_ST_COV | 6 | STOCK_COVERAGE_SUPPLY | 0VC_SUP_2 |
| ... | ... | ... | ... |

*FIG. 5*

ITERATIVE MEASURES

BACKGROUND

Systems for storing and providing business data may model the data using logical entities such as dimensions and measures. Dimensions represent sets of values along which an analysis may be performed or a report may be generated (e.g., Country, Year, Product), and measures are indicators, most often numeric, whose values can be determined for a given combination of dimension values. For example, a Sales measure may be used to determine the total sales for January (i.e., a value of the Month dimension) in France (i.e., a value of the Country dimension).

Measures may be used in formulas, in conditions, and in any navigation state of a query. Types of measures may include "basic" measures, "restricted" measures (i.e., measures filtered by one or more dimension values), and "calculated" measures (i.e., measures defined by a formula, which may include one or more measures, constants and operators).

BRIEF DESCRIPTION OF THE DRAWINGS

FIG. 5 is a tabular representation of a portion of an association table according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
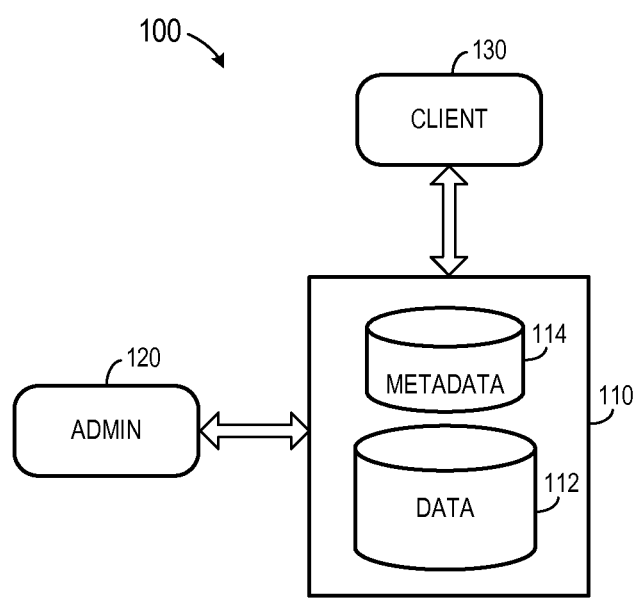
FIG. 1 is a block diagram of a system according to some embodiments.

FIG. 1 is a block diagram of system 100 according to some embodiments. System 100 includes database 110, administrator 120 and client 130. System 100 may generally operate to store data within database 110 and provide the data to client 130.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. Data 112 of database 110 may be distributed among several relational databases, multi-dimensional databases, and/or other data sources. Embodiments are not limited to any number or types of data sources. For example, database 110 may comprise one or more OnLine Analytical Processing (OLAP) databases (i.e., cubes), spreadsheets, text documents, presentations, etc.

Database 110 may implement an "in-memory" database, in which volatile (e.g., non-disk-based) storage (e.g., Random Access Memory) is used both for cache memory and for storing data 112 during operation, and persistent storage (e.g., one or more fixed disks) is used for offline persistency of data 112 and for maintenance of database snapshots. Alternatively, volatile storage may be used as cache memory for storing recently-used database data, while persistent storage stores data 112. In some embodiments, the data 112 comprises one or more of conventional tabular data, row-based data stored in row format, column-based data stored in columnar format, and object-based data. Database 110 may also or alternatively support multi-tenancy by providing multiple logical database systems which are programmatically isolated from one another. Moreover, data 112 may be indexed and/or selectively replicated in an index to allow fast searching and retrieval thereof.

Database 110 may store metadata 114 describing regarding the structure, relationships and meaning of data 112. This information may be generated by a database administrator operating administrator 120, and may include data defining the schema of database tables stored within data 112. A database table schema may specify the name of a database table, columns of the database table, the data type associated with each column, and other information associated with the database table. Administrator 120 may also define, within metadata 114, a logical schema of dimensions, measures, and properties and their respective logical associations with the database tables.

As mentioned above, database 110 generally provides data 112 to clients, such as client 130, in response to requests received therefrom. In some embodiments, a user issues an instruction to client 130 to analyze a set of values, such as the values stored in a column of a database table. Client 130 generates a statement execution plan based on the instruction and on the structure of data 112, as specified in metadata 114. The plan is forwarded to database 110, which executes the plan and returns a dataset to client 130 based on the plan. Embodiments are not limited thereto.

Each of administrator 120 and client 130 may comprise one or more devices executing program code of a software application for presenting user interfaces to allow interaction with database 110. Presentation of a user interface may comprise any degree or type of rendering, depending on the type of user interface code generated by database 110. For example, administrator 120 may execute a Web Browser to receive a Web page (e.g., in HTML format) from database 110, and may render and present the Web page according to known protocols. Either administrator 120 or client 130 may also or alternatively present user interfaces by executing a standalone executable file (e.g., an .exe file) or code (e.g., a JAVA applet) within a virtual machine.

Figure 2:
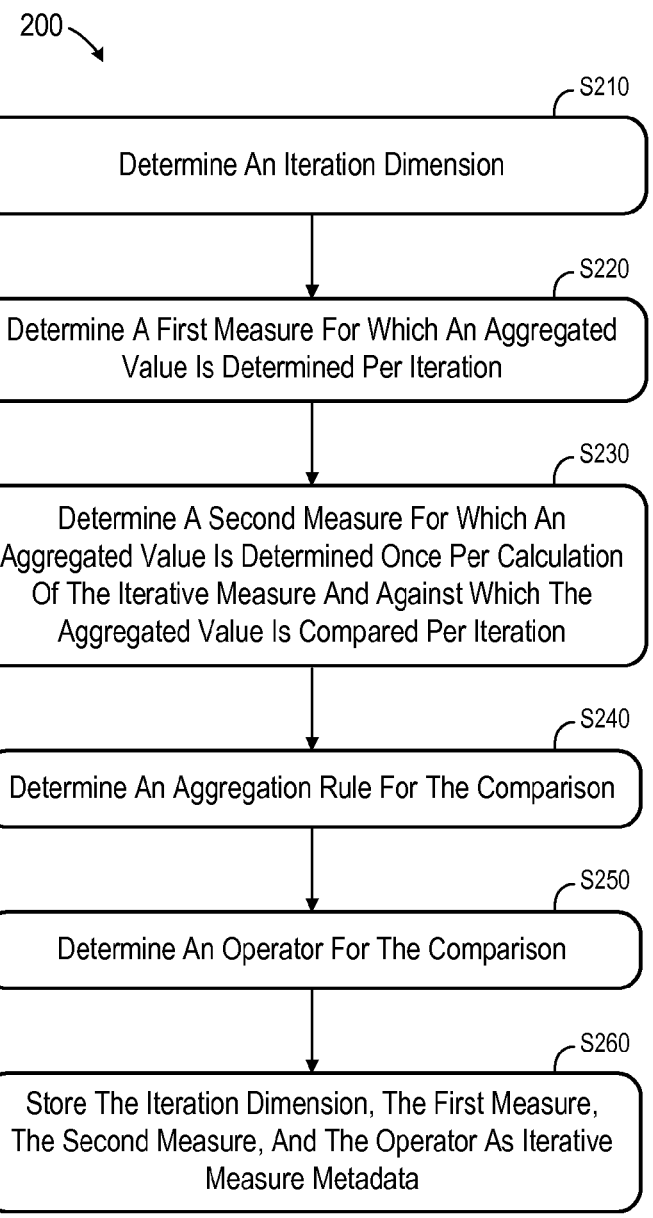
FIG. 2 is a flow diagram of a process according to some embodiments.

FIG. 2 comprises a flow diagram of process 200 according to some embodiments. In some embodiments, various hardware elements of data source 110 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 may be executed to define (or model) an iterative measure within data source 110. As will be evident from the foregoing, the definition of an iterative measure may provide efficiencies and advantages during operation of a database system according to some embodiments.

Initially, an iteration dimension is determined at S210. The iteration dimension is a dimension over which to iterate, and implicitly specifies the granularity of the dimension which is represented by each iteration. The iteration dimension is an element of a formula which will be evaluated in order to determine the value of an iterative measure according to some embodiments.

Generally, an iterative measure according to some embodiments is expressed using the following formula:

$$\text{IterativeMeasure}(d) = \text{aggr\_rule}(j | \text{SecondMeasure}(d) \text{ operator} \Sigma_{i=d+1}^{d+j} \text{FirstMeasure}(i))$$

In the above formula, d represents the iteration dimension of S210. The other elements of the formula will be described below.

Process 200 will be described with respect to an iterative measure which represents the number of days for which the current stock of an item covers demand for that item. This number may be referred to as "stock coverage in weeks". Embodiments are not limited to this particular measure.

In one illustrative example, a store currently stocks 20 pairs of jeans. The demand over each of the next four time periods (e.g., t=week) is 10, 6, 4, and 3, respectively. The 20 pairs in stock cover the first three demand periods (i.e., 20≥20), but do not cover the fourth demand period. Accordingly, the stock coverage is 3 periods. In this example, the iteration dimension determined at S210 is Week, and the implicitly specified dimension value granularity is one week.

Stock coverage may be calculated using the following formula:

$$\text{StockCoverage}(t) = \max(j | \text{Stock}(t) \geq \Sigma_{i=t+1}^{t+j} \text{Demand}(i))$$

The above formula includes measures (i.e., Stock and Demand) and a dimension (t=Week). Demand corresponds to FirstMeasure in the general formula shown above and Stock corresponds to SecondMeasure in the general formula. In contrast, formulas for calculated measures typically include measures only, and operate only in a row context. Moreover, the iteration of the above formula is conditional, in that the iteration terminates once the aggregated demand exceeds the stock. Conventional measures are also unable to support such a conditional iteration.

The determination at S210 may be based on input received by a user interface. In one example of S210, administrator 120 invokes a user interface for managing metadata. As described above, such a user interface may be generated and displayed by an application executing on administrator 120, may comprise a Web page or other interface provided to administrator 120 by database 110 and displayed thereby, or may be displayed by any other means.

Figure 3:
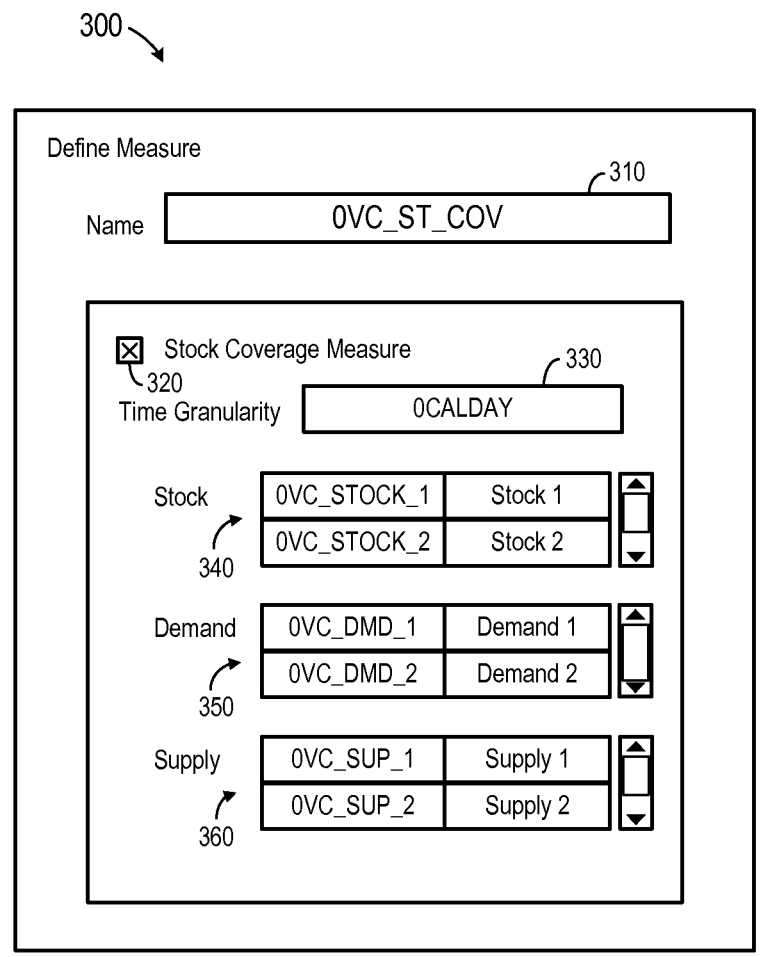
FIG. 3 is an outward view of a user interface according to some embodiments.

FIG. 3 is an outward view of user interface 300 according to some embodiments. User interface 300 facilitates the generation of metadata to define measures according to some embodiments. Embodiments may utilize any other user interface or system for performing the determination at S210 and/or the remaining determinations of process 200.

User interface 300 includes input field 310 for naming the measure to be defined, and checkbox 320 to specify whether or not the measure is a stock coverage measure according to some embodiments.

The iteration dimension (i.e., the dimension over which to iterate) is defined within input field 330. In the present example, "0CALDAY" is defined as dimension over which to iterate. Accordingly, the determination at S210 may be based on the information which is input into field 330.

Continuing with process 200, a first measure is determined at S220. The first measure is a measure for which an aggregated value is determined per iteration. In the two formulas shown above, this measure is FirstMeasure and Demand, respectively. Accordingly, the administrator has completed fields 350 of interface 300 to define this measure.

Area 360 of interface 300 also allows specification of another measure (i.e., Supply) which is used to determine the aggregated value per iteration. Using such a measure, the above formula becomes:

$$\text{StockCoverage}(t) = \max(j | \text{Stock}(t) \geq \Sigma_{i=t+1}^{t+j} [\text{Demand}(i) - \text{Supply}(i)])$$

At S230, a second measure is determined to compare the aggregated value against, per iteration. In the present example and the above formula, the value is the Stock measure. Some embodiments may determine a constant value instead of a measure at S230 against which to compare the aggregated value, per iteration.

An aggregation rule for the comparison (i.e., aggr_rule in the above formula) is determined at S240. The aggregation rule is a rule to aggregate the values of j for which the comparison evaluates to true. Typical aggregation rules are maximum and minimum. Embodiments may employ other aggregation rules including, but not limited to, sum, average and median. The aggregation rule according to the present example is "max" and is hard-coded into the metadata for the stock coverage measure, because interface 300 is specifically intended for stock coverage measures which are evaluated using the above stock coverage formula.

An operator for the comparison is determined at S250. The operator according to the present example is "≥" and is also hard-coded into the metadata for the stock coverage measure. Some embodiments may allow the administrator to specify the aggregation rule and/or the operator for the comparison.

Interface 300 enables the user to enter one or more measures for stock, demand and supply. The interface ensures that at least one measure is entered for stock and demand. In case multiple measures are entered for stock, the stock measures are aggregated before the calculation of the stock coverage measure. The same is true for multiple demand or supply measures. In case no measure is entered for supply, the calculation does not consider supply.

Embodiments may provide a checkbox to define whether or not the measure is a more generic iterative measure according to some embodiments instead of a checkbox to define whether or not the measure is specifically a stock coverage measure.

Finally, at S260, the iteration dimension, the measures, the aggregation rule, and the operator are stored as measure metadata. This metadata may be stored in metadata 114 of database 110 according to some embodiments.

Figure 4:
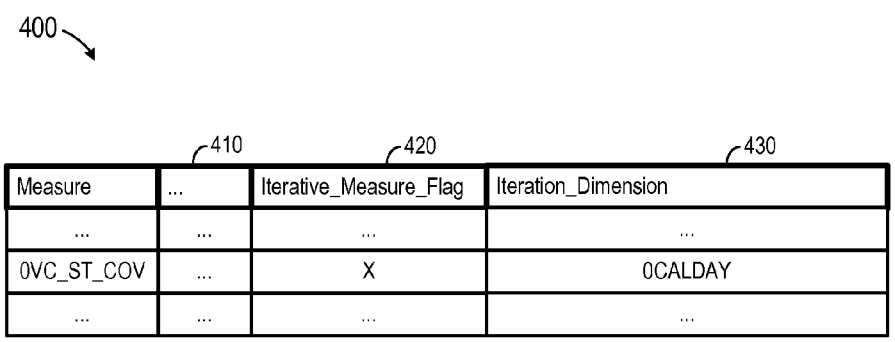
FIG. 4 is a tabular representation of a portion of a header table according to some embodiments.

FIGS. 4 and 5 illustrate tables to store the measure metadata according to some embodiments. In addition to conventional columns 410, header table 400 of FIG. 4 includes Iterative_Measure_Flag column 420 and Iteration_Dimension_column 430. Iterative_Measure_Flag column 420 includes a Boolean flag which marks the associated measure as an iterative measure, while Iteration_Dimension column 430 specifies the dimension value granularity per iteration as described above.

Association table 500 of FIG. 5 specifies the measures which are associated with an iterative measure, and a type for each association. FIG. 5 illustrates six associations which are generated based on the information entered into interface 300 of FIG. 3 according to some embodiments.

By virtue of some embodiments of the foregoing, the calculation of an iterative measure can be controlled by a database client such as client 130, which may comprise an OLAP analytical engine. Accordingly, as long as the database client is aware of the semantics of an iterative measure, a corresponding formula for the iterative measure need not be implemented in metadata 114. Moreover, the iterative measure may be used as any other measure within system 100, like in a formula, a calculated measure or a restricted measure.

Figure 6:
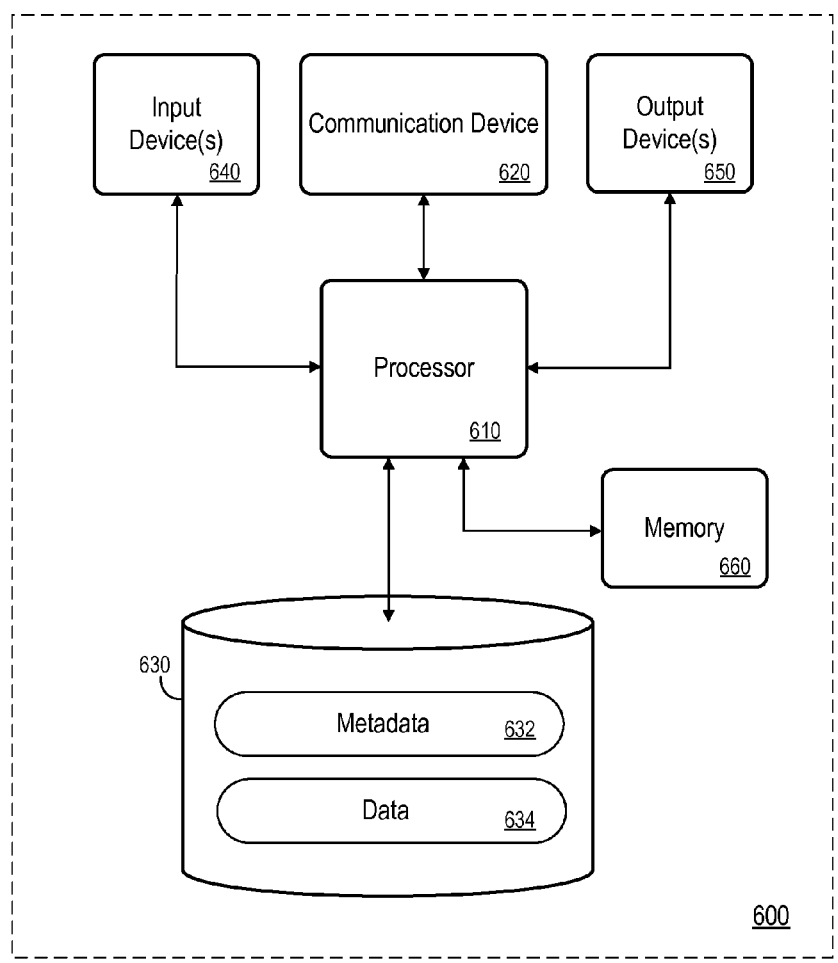
FIG. 6 is a block diagram of a system according to some embodiments.

FIG. 6 is a block diagram of system 600 according to some embodiments. System 600 may comprise a general-purpose computing system and may execute program code to perform any of the processes described herein, including but not limited to process 200. System 600 may comprise an implementation of database 110, and may include other unshown elements according to some embodiments.

System 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Metadata 632 and data 634 may respectively implement metadata 112 and data 114 as described above. As also described above, metadata 632 and data 634 may be implemented in volatile memory such as memory 660. Data storage device 630 may also store data and other program code for providing additional functionality and/or which are necessary for operation of system 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of database 110 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
   a data storage device;
   a memory storing processor-executable program code; and
   a processor to execute the processor-executable program code in order to cause the computing system to:
      determine a dimension over which to iterate, wherein the dimension is a time dimension;
      determine a first measure for which an aggregated value is determined per iteration, wherein the first measure is a demand measure;
      determine a second measure for which a value is determined once per calculation of an iterative measure, wherein the second measure is stock;
      determine an operator for comparison of the aggregated value against the second measure per iteration;
      determine an aggregation rule; and
      store the dimension, the first measure, the second value, the operator and the aggregation rule as metadata to define the iterative measure.

2. A non-transitory computer-readable medium storing program code, the program code executable by a processor of a computing system to cause the computing system to:
   determine a dimension over which to iterate, wherein the dimension is a time dimension;
   determine a first measure for which an aggregated value is determined per iteration, wherein the first measure is a demand measure;
   determine a second measure for which a value is determined once per calculation of an iterative measure, wherein the second measure is stock;
   determine an operator for comparison of the aggregated value against the second measure per iteration;
   determine an aggregation rule; and
   store the dimension, the first measure, the second value, the operator and the aggregation rule as metadata to define the iterative measure.

3. A computer-implemented method comprising:
   determining a dimension over which to iterate, wherein the dimension is a time dimension;
   determining a first measure for which an aggregated value is determined per iteration, wherein the first measure is a demand measure;
   determining a second measure for which a value is determined once per calculation of an iterative measure, wherein the second measure is stock;
   determining an operator for comparison of the aggregated value against the second measure per iteration;
   determining an aggregation rule; and
   storing the dimension, the first measure, the second measure, the operator and the aggregation rule as metadata to define the iterative measure.

* * * * *